(12) United States Patent
Stewart

(10) Patent No.: US 6,863,804 B1
(45) Date of Patent: Mar. 8, 2005

(54) PRE-FILTER DEVICE

(76) Inventor: Howard C. Stewart, 4402 Essex Ct., High Point, NC (US) 27265

( * ) Notice: Subject to any disclaimer, the term of this patent is extended or adjusted under 35 U.S.C. 154(b) by 76 days.

(21) Appl. No.: 10/355,524

(22) Filed: Jan. 31, 2003

(51) Int. Cl.$^7$ ............................................. B01D 35/14
(52) U.S. Cl. ....................... 210/130; 210/314; 210/499
(58) Field of Search ............................... 210/130–133, 210/311, 314, 316, 335, 433.1, 434, 443, 444, 495, 499

(56) References Cited

U.S. PATENT DOCUMENTS 2,646,884 A * 7/1953 Findley ........................ 210/94
5,112,476 A * 5/1992 Cote et al. ..................... 210/85
5,316,665 A   5/1994 Hart

* cited by examiner

Primary Examiner—Joseph Drodge

(57) ABSTRACT

A pre-filter device for use with filter canisters is described which will prevent pressure build-up, clogging and engine damage. The pre-filter device comprises a metal screen having a relief port positioned within the pre-filter device for collecting the majority of the larger metallic particles and debris suspended within the oil.

9 Claims, 2 Drawing Sheets

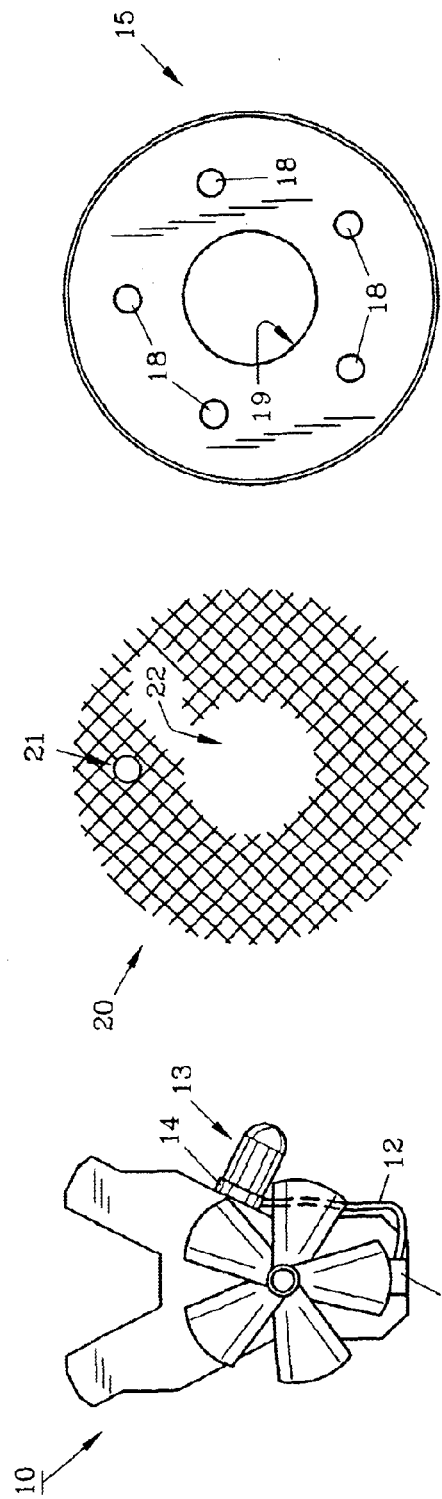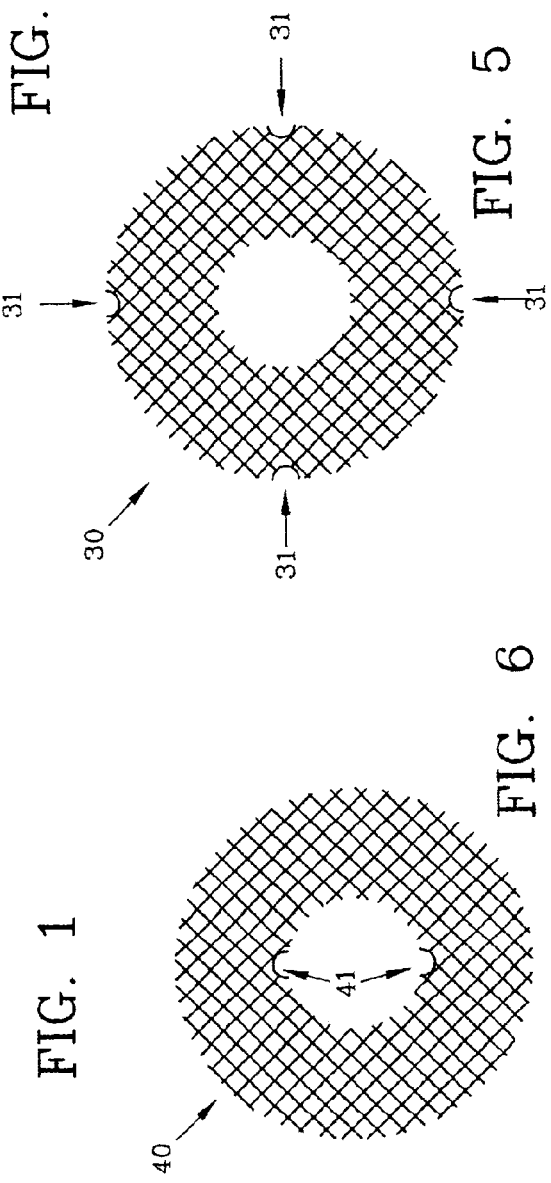

PRE-FILTER DEVICE

FIELD OF THE INVENTION

The invention herein pertains to filtering oil and particularly pertains to pre-filters as they are used with disposable engine oil filter canisters.

DESCRIPTION OF THE PRIOR ART AND OBJECTIVES OF THE INVENTION

Internal combustion engine systems in automobiles and other vehicles utilize a disposable filter canister for removing impurities such as metallic particles contained within the lubricating oil. An oil pump forces the oil from the engine through a filter within the disposable filter canister where it is cleaned and then returned to the engine block. New engines generally generate larger amounts of metallic particles as the engine parts rub together during the break-in period.

In recent years pre-filters have been placed atop the oil filter canisters in order to collect the metallic particles and prevent them from entering the filter contained within the canister. These pre-filters work but only to a limited degree. It has been found in certain cases that excess particles collect on the re-filter and block or restrict the normal flow of oil and can cause a large pressure build-up. When this happens, the engine can be severely damaged due to the lack of oil flow. As there is no practical way to judge the amount of metallic particles within the oil, the use of a pre-filter can cause engine damage before the owner realizes that a problem exists.

Thus, in view of the problems and disadvantages of conventional oil pre-filters, the present invention was conceived and one of its objectives is to provide a pre-filter device for an oil filter canister which will prevent an unusual pressure build-up in the lubricating oil system of an internal combustion engine.

It is still another objective of the present invention to provide a pre-filter device which will remove the majority of metallic particles and other debris from the oil.

It is yet another objective of the present invention to provide a pre-filter device in the form of a planar, circular screen which is placed over the inlet ports of an oil filter canister.

It is yet a further objective of the present invention to provide a pre-filter device in the form of a screen which has one or more relief ports therein.

Various other objectives and advantages of the present invention will become apparent to those skilled in the art as a more detailed description is set forth below.

SUMMARY OF THE INVENTION

The aforesaid and other objectives are realized by providing a prefilter device in the form of a screen which is sized to fit within a filter canister of the lubricating oil system of an internal combustion engine system. The pre-filter device consists of a circular metallic screen disk which includes a central opening and a pressure relief port. The pressure relief port is preferably a circular opening within the screen although in alternate embodiments the relief ports may be placed along the inner or outer edges of the screen. Oil pumped from She oil pump to the oil filter passes through the prefilter device and into the filter inlets. The pre-filter device collects most metallic particles and other debris within the flowing oil. The pressure relief port prevents a pressure build-up as by allowing certain of the metallic particles within the oil to pass through the inlet ports into the filter canister where they are collected by the filter. The oil then, as conventional flows back to the engine block where it is distributed.

BRIEF DESCRIPTION OF THE DRAWINGS

FIG. 1 illustrates a schematic representation of a v-type block of an internal combustion engine system with a conventional filter canister thereon;

FIG. 3 demonstrates a top view of the preferred form of the invention as along lines 3—3 of FIG. 2;

FIG. 4 features the top of the filter canister as along lines, 4—4 of FIG. 2;

FIG. 5 depicts a first alternate embodiment of the prefilter device; and

FIG. 6 shows a second alternate embodiment of the prefilter device.

DETAILED DESCRIPTION OF THE PREFERRED EMBODIMENT AND OPERATION OF THE INVENTION

Figure 2:
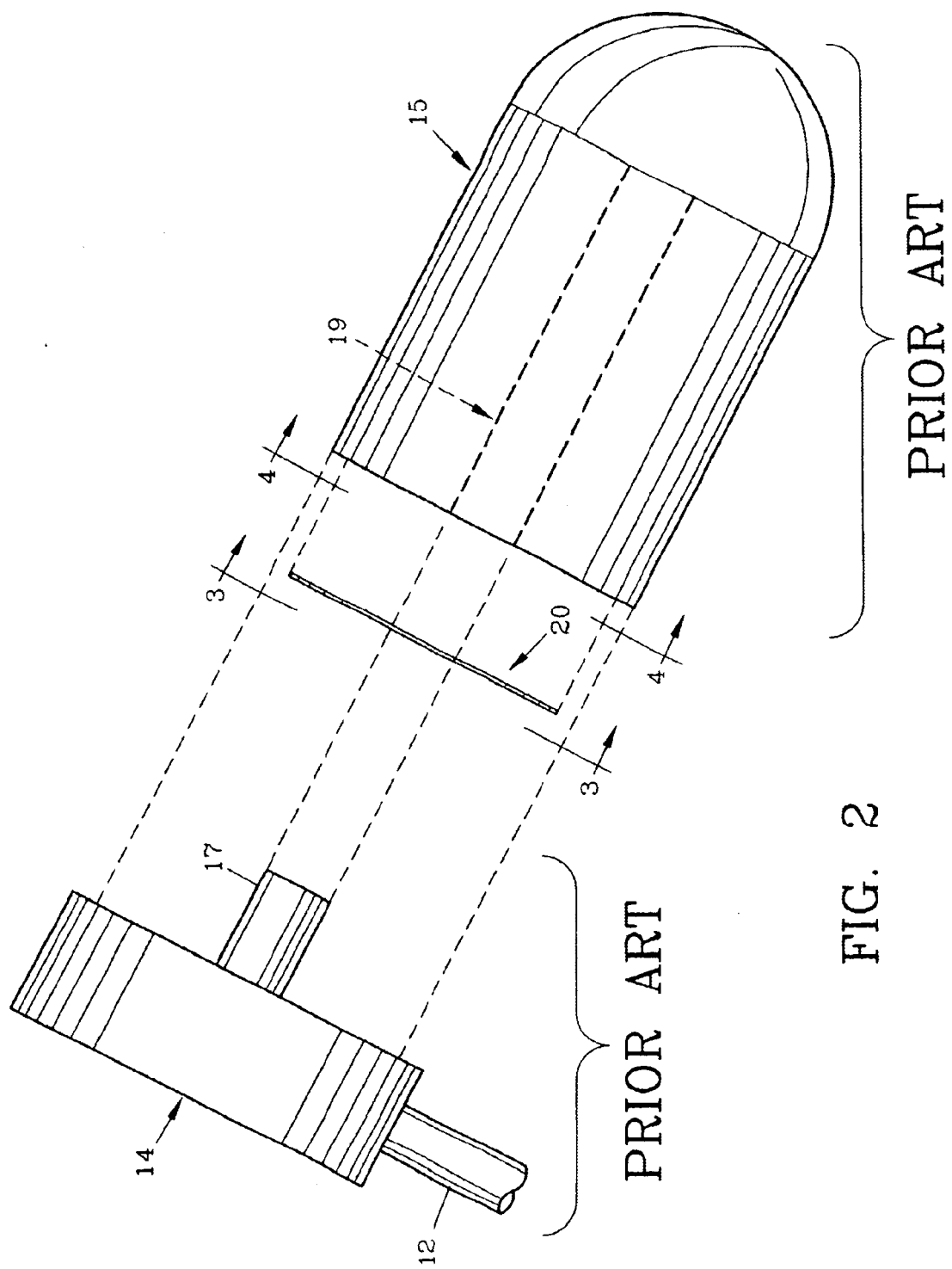
FIG. 2 shows an enlarged view of the oil filter as removed from the engine block as in FIG. 1 and exploded for clarity.

For a better understanding of the invention and its operation, turning now to the drawings, FIG. 1 demonstrates a conventional v-type engine block 10 having oil pump 11 with supply line 12 connected to oil filter 13. Oil filter 13 includes base 14 attached to engine block 10 for containing disposable filter canister 15 thereon. As would be understood, oil pump 11, oil line 12, oil filter base 14 and filter canister 15 are all conventional components in the industry.

In FIG. 2, oil filter 13 is shown in an enlarged exploded fashion with preferred pre-filter device 20 seen positioned between base 14 and disposable filter canister 15 to cover the top of filter canister 15 as further shown in FIG. 4. Preferred pre-filter device 20 as seen in FIG. 3 consists of a metal screen disk with a mesh size of approximately sixteen hundred (1600) openings per square inch. Preferably, pre-filter device 20 is formed from stainless steel although other metals or materials may be used. As further shown in a top view in FIG. 3, pre-filter device 20 includes circular relief port 21 along with central opening 22 for receiving nipple 17 of base 14. Pre-filter device 20 has a diameter of approximately 6.35 cm (2.5 inches), a central opening (22) with a diameter of if approximately 2.33 cm (0.937 inches) and a relief port (21) with a diameter of approximately 0.276 cm (0.1087 inches) Thus relief port 21 has a preferred area of about 8.5% of the total area of pre-filter device 20. The relief port may range from about 5% to about 15% of the total area of the pre-filter device.

Pre-filter device 20 is placed atop filter canister 15, as seen in FIG. 2. Thus, oil pumped through supply line 12 enters base 14 and passes downwardly through pre-filter device 20 and into inlets 18 shown in FIG. 4. The oil then passes through a standard paper or other filter material (not seen) contained within canister 15. The oil pressure forces the filtered oil upwardly through central tube 19 of canister 15, into nipple 17 and through portals (not seen) in base 14 to engine block 10 where it is distributed throughout the engine as conventional.

During oil flow from pump 11 to filter canister 15, the oil contacts and passes through pre-filter device 20 which helps in removing contaminants such as metallic particles and other debris. However, it has been found that conventional pre-filter screens can quickly clog from such contaminants and prevent oil flow, causing serious damage to the internal parts of the engine in order to remedy this problem, a pressure relief port such as relief port 21 shown in FIG. 3 is placed within prefilter device 20 to eliminate this problem. As shown, relief port 21 is approximately one fifth (⅕) the diameter of central opening 22. Some contaminants such as metallic particles will pass through relief port 21. However, these particles are caught by the filter (not seen) within canister 15 and do not cause harm to the engine. Pressure relief port 21 has been found necessary to prevent termination of the oil flow when a pre-filter screen is used.

As shown in FIGS. 5 and 6, alternate embodiments of the pre-filter device are seen with pressure relief ports 31 and pressure relief ports 41 which also relieve pressure from the surface of pre-filter devices due to metallic particles or the like which clog the pre-filter devices. In FIG. 5, relief ports 31 are shown along the edges of screen pre-filter device 30, whereas in FIG. 6, relief ports 41 are positioned along central opening 42 of screen pre-filter device 40. The exact size and number of relief ports can be varied. However, the relief port must be sized larger than the screen openings to allow flow through of contaminants, thereby preventing pressure build-up along the surface of the pre-filter device. It is preferable to have an area of approximately 20% of the central opening for the relief port, but other area sizes may be used ranging from 10-30% of the area of the central opening.

The Illustrations and examples provided herein are for explanatory purposes and are not intended to limit the scope of the appended claims.

I claim:

1. A pre-filter device for an oil filter comprising: a screen, said screen sized to generally cover the top of the oil filter, said screen defining mesh openings, a central opening and a relief port, said relief port sized less than said central opening and of greater size than individual ones of said mesh openings to allow oil contaminants therethrough.

2. The pre-filter device of claim 1 wherein said relief port is circular.

3. The pre-filter device of claim 1 wherein said relief port is along the outer edge of said screen.

4. The pre-filter device of claim 1 wherein said relief port is along the central opening.

5. The pre-filter device of claim 1 wherein said relief port is spaced between said outer screen edge and said central opening.

6. A pre-filter device for an oil filter comprising: a screen, said screen sized to cover one end of the oil filter, said screen comprising a disk, and said disk defining mesh openings, a central opening and a relief port said relief port of greater size than individual ones of said mesh openings.

7. The pre-filter device of claim 6 wherein said relief port is circular.

8. The pre-filter device of claim 6 wherein said relief port is spaced along the outer edge of said disk.

9. The pre-filter device of claim 6 wherein said relief port is spaced along the edge of said central opening.

* * * * *